(12) United States Patent
Spelman et al.

(10) Patent No.: US 9,131,727 B2
(45) Date of Patent: Sep. 15, 2015

(54) MILK ACIDIFICATION COMPOSITION FOR POWDERED BEVERAGE

(75) Inventors: Kieran Patrick Spelman, New City, NY (US); Jimbay P. Loh, Green Oaks, IL (US); Maria Velissariou, Scarsdale, NY (US); Yeong-Ching Albert Hong, Kildeer, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 1652 days.

(21) Appl. No.: 12/174,185

(22) Filed: Jul. 16, 2008

(65) Prior Publication Data

US 2010/0015290 A1    Jan. 21, 2010

(51) Int. Cl.
- A23C 9/18 (2006.01)
- A23L 1/304 (2006.01)
- A23L 2/39 (2006.01)
- A23C 9/154 (2006.01)

(52) U.S. Cl.
CPC .............. *A23L 2/39* (2013.01); *A23C 9/1542* (2013.01); *A23V 2002/00* (2013.01)

(58) Field of Classification Search
CPC ................................ A23L 2/39; A23C 9/1542
USPC .................... 426/34, 61, 583, 588, 522
See application file for complete search history.

(56) References Cited

U.S. PATENT DOCUMENTS

| | | | |
|---|---|---|---|
| 3,030,213 A * | 4/1962 | Tidridge et al. | 426/576 |
| 3,931,433 A | 1/1976 | Eskritt et al. | |
| 4,081,567 A | 3/1978 | Haber | |
| 4,289,789 A | 9/1981 | Cajigas | |
| 4,530,850 A | 7/1985 | Trop | |
| 4,590,077 A * | 5/1986 | Trop | 426/61 |
| 5,145,697 A | 9/1992 | Cajigas | |
| 5,266,343 A * | 11/1993 | Stauffer | 426/522 |
| 6,824,810 B2 | 11/2004 | Sargent et al. | |
| 2002/0127325 A1 * | 9/2002 | Gandhi et al. | 426/634 |
| 2008/0152777 A1 | 6/2008 | Cobos | |

FOREIGN PATENT DOCUMENTS

| | | |
|---|---|---|
| EP | 0 040 654 A2 | 12/1981 |
| EP | 0471904 | 2/1992 |
| EP | 1 810 579 A1 | 7/2007 |
| GB | 878 793 A | 10/1961 |
| GB | 1 537 456 A | 12/1978 |
| GB | 1 541 461 A | 2/1979 |
| JP | 10004876 | 1/1998 |
| JP | 2005073576 | 3/2005 |
| WO | 9203058 | 3/1992 |
| WO | 2009/047657 A2 | 4/2009 |

OTHER PUBLICATIONS

NPL "Pasteurization Mewthods" retrieved on Jul. 5, 2011.*
European Extended Search Report, European Patent Application No. 09 16 5338, date of completion of the search—Sep. 23, 2009, 8 pages.

* cited by examiner

*Primary Examiner* — Michele L Jacobson
*Assistant Examiner* — Bhaskar Mukhopadhyay
(74) *Attorney, Agent, or Firm* — Fitch, Even, Tabin & Flannery LLP

(57) ABSTRACT

The present invention relates to instant acidified milk beverages and methods for producing such instant acidified milk beverages. More specifically, the present invention provides a powdered composition which can be added to a liquid milk product with minimal mixing to produce an instant acidified milk beverage having a smooth texture. Even more specifically, the powdered composition includes at least one edible monobasic salt of polyprotonic acid. The powdered composition may include a buffer salt, and other optional ingredients such as sweetener, thickener, fiber, bulking agent, anti-caking agent, fruit juice solid, flavor, and colorant, etc.

24 Claims, No Drawings

MILK ACIDIFICATION COMPOSITION FOR POWDERED BEVERAGE

FIELD OF THE INVENTION

The present invention relates to instant acidified milk beverages and methods for producing such instant acidified milk beverages. More specifically, the present invention provides a powdered composition which can be added to a milk product with minimal mixing to produce an instant acidified milk beverage having a smooth texture.

BACKGROUND OF THE INVENTION

Attempts have been made to provide powdered compositions suitable for mixing with milk or water for the manufacture of non-gelled acidified, milk-product drinks. For example, U.S. Pat. No. 4,530,850 (Jul. 23, 1985) provided a powdered composition that, upon mixing with milk, formed a non-gelled, acidified, milk-product drink without curdling of the milk proteins. The powdered composition contained about 1 to about 9 percent of an edible acid, about 0.5 to about 1.9 percent of an instant cold-water soluble gelatin, about 1 to about 10 percent of an edible natural or modified polysaccharide gum, about 20 to about 90 percent sweetening agents, and an effective amount of flavoring and coloring agents. The beverage was prepared by vigorously mixing (e.g., in a blender at high speed for 10 seconds or in a shaker for an unlisted time) the powdered composition into milk. It was reported that the gelatin included in the powder became attached to the casein in the milk, thereby stabilizing the milk proteins at lower pH; the gum was reportedly used to improve the viscosity and texture of the final beverage product. Attempts to prepare the beverage of U.S. Pat. No. 4,530,850 without vigorous mixing (i.e., gently mixing with a spoon) by the present inventors were generally unsuccessful.

U.S. patent application Ser. No. 11/958,490, owned by the same assignee of the present invention, provided instant acidified milk beverages and methods for producing such instant acidified milk beverages. It also provided a powdered composition which can be added to a milk product with minimal mixing to produce an instant acidified milk beverage having a smooth texture. The powdered composition generally contained sugar, citric acid, a buffering or bite reducing agent, guar gum, artificial sweeteners, a calcium fortification agent, emulsifiers, and optional flavorings and colorants. Typically, the powdered composition disclosed in U.S. patent application Ser. No. 11/958,490 was combined with pasteurized liquid milk to provide the desired beverage. Most of the milk produced in Brazil is pasteurized using the ultra high temperature ("UHT") method (i.e., typically 130° C. to 138° C. for two to four seconds). Thus, the inventors used only UHT pasteurized milk in developing their invention. It was assumed that this invention would work with milk independent of the pasteurization method used.

It has now been determined that when the powdered composition disclosed in U.S. patent application Ser. No. 11/958, 490 is combined with liquid milk pasteurized using the high temperature short time method ("HTST"), the milk frequently curdles. Since most milk produced in the United States is pasteurized using the HTST pasteurization method (typically at 71.5° C. for 15 seconds), the invention described in U.S. patent application Ser. No. 11/958,490 has limited usefulness in the United States (or other locations where HTST pasteurization methods are used). The present invention overcomes this limitation of the co-owned invention because it provides a way of acidifying HTST milk products without producing any curds.

SUMMARY OF THE INVENTION

The present invention relates to instant acidified milk beverages and methods for producing such instant acidified milk beverages. More specifically, the present invention provides a powdered composition which can be added to a pasteurized liquid milk product, independent of the method used to pasteurize the milk, with minimal mixing to produce an instant acidified milk beverage having a smooth texture. Although the present invention can use either UHT or HTST pasteurized milk, it is especially useful for HTST pasteurized milk.

The present invention provides a powdered composition for preparing an instant acidified milk beverage with a pH ranging from about 5.0 to about 6.2 using a pasteurized liquid milk product, comprising at least one edible monobasic salt of polyprotonic acid with a pKa less than about 4.4, and one or more optional ingredients such as sweetener, thickener, buffering salt, fiber, bulking agent, anti-caking agent, fruit juice solid, fortificants, flavorant and colorant. The powdered composition can be incorporated into the pasteurized liquid milk product, independent of the pasteurization method used, with minimal mixing to form an acidified milk beverage with a pH between 5.0 and 6.2, and good organoleptic properties.

The edible monobasic salt of polyprotonic acid is selected from the group consisting of citrate, phosphate, malate, adipate, fumarate, tartarate, pyrophosphate, and mixtures thereof.

In another aspect, the powdered composition may further include a buffer salt selected from the group consisting of dibasic mineral salts of citrate, dibasic mineral salts of phosphate, dibasic mineral salts of pyrophosphate, tribasic mineral salts of citrate, tribasic mineral salts of phosphate, tribasic mineral salts of pyrophosphate, dibasic mineral salts of malate, dibasic mineral salts of adipate, dibasic mineral salts of fumarate, and dibasic mineral salts of tartarate.

DETAILED DESCRIPTION

The invention relates to instant acidified milk beverages and methods for producing such instant acidified milk beverages. The present invention provides a powdered composition which can be added to any milk product (e.g., pasteurized by UHT or HTST technique as well as powdered milk reconstituted with water). The product is prepared with minimal mixing to produce an instant acidified milk beverage having a smooth texture.

The powdered compositions comprise at least one edible monobasic salt of polyprotonic acid with pKa of 4.4 or below. Preferably, the edible monobasic salt of polyprotonic acid is selected from the group consisting of salts of citrate, phosphate, malate, adipate, fumarate, tartarate, pyrophosphate, and mixtures thereof. More preferably, the edible monobasic salt of polyprotonic acid is selected from group consisting of salts of citrate and phosphate. Most preferably, the edible monobasic salt of polyprotonic acid is a monobasic mineral salt selected from the group consisting of monopotassium citrate, monosodium citrate, monocalcium citrate, monomagnesium citrate, monopotassium phosphate, monosodium phosphate, monocalcium phosphate, monomagnesium phosphate, and mixtures thereof.

The powdered composition of the present invention may further include a buffer salt selected from the group consisting of dibasic mineral salts of citrate, dibasic mineral salts of phosphate, dibasic mineral salts of pyrophosphate, tribasic mineral salts of citrate, tribasic mineral salts of phosphate, tribasic mineral salts of pyrophosphate, dibasic mineral salts of malate, dibasic mineral salts of adipate, dibasic mineral salts of fumarate, and dibasic mineral salts of tartarate. In a preferred embodiment, the buffer salt is selected from the group consisting of disodium citrate, trisodium citrate, dicalcium citrate, tricalcium citrate, dimagnesium citrate, trimagnesium citrate, disodium phosphate, trisodium phosphate, dipotassium phosphate, tripotassium phosphate, dicalcium phosphate, tricalcium phosphate, and mixtures thereof.

The powdered compositions of the present invention include one or more optional ingredients such as sweetener, thickener, buffering salt, fiber, bulking agent such as maltodextrin and the like), anti-caking agent, fruit juice solid, fortificants, flavorant and colorant. The powdered compositions of the present invention may also contain optional colorants, minerals, prebiotics, or probiotics and/or fiber.

The powdered composition does not require and is substantially free from common food grade acids such as citric acid, malic acid, fumaric acid, phosphoric acid, lactic acid, and the like. For purposes of the present invention, for the powdered composition to be "substantially free from common food grade acids" means that the amounts of common food grade acids present in the powdered composition, if any, does not result in curdling when the powdered composition is added to milk and minimal mixing. For example, the composition should generally contain about less than about 0.2 g citric acid per 240 mls of milk (or equivalent amounts of other common food grade acids), preferably about less than about 0.1 g per 240 mls of milk, and more preferably with no added common food grade acids. The amount of acid specified is the total in the powdered beverage composition, as other ingredients such as flavors and juice solids etc. may contain small amounts of food grade acids which contribute to the total level of acid in the composition. Accordingly, other components of the beverage may contain natural acids, so long as they do not cause curds to form in the beverage. When common food grade acids such as citric acid, malic acid, fumaric acid, phosphoric acid, lactic acid, and the like are used to acidify the beverage in HTST pasteurized milk, curds form in the beverage, which is not desirable. Although not wanting to be limited by theory, it is believed that the edible acidic monobasic mineral salt of polyprotonic acids has a lower acidity compared to typical food grade acidulants (such as citric acid etc.); therefore, the edible acidic monobasic mineral salt of polyprotonic acids does not "shock" the proteins in the milk by producing localized high acid areas as shown in common food grade acids, such as citric acid, malic acid, fumaric acid, phosphoric acid, lactic acid, and the like.

The powdered composition is prepared by dry mixing all of the powders in the formula into a homogenous mixture.

The powdered composition, when added to a pasteurized milk product (e.g., whole milk, 2% milk, 1% milk, skim milk, and the like prepared using any pasteurization method or to powdered milk reconstituted with water), will only require minimal mixing to obtain the desired acidified milk beverage. Preferably, the milk is pasteurized using the high temperature short time process; although, the powdered composition of the present invention can be used for all types of milk.

For purposes of this invention, "minimal mixing" is intended to mean hand mixing using a simple hand mixing device such as a spoon. Blenders and mechanical mixing devices (e.g., rotator mixers operated by hand or electrical power, shaker devices, and the like) are specifically not required or included in the definition of minimal mixing. Of course, as one skilled in the art will understand, the requirement that only "minimal mixing" is required to obtain the desired acidified milk beverage does not mean that the consumer cannot use more vigorous mixing conditions, but only that such more vigorous mixing conditions or equipment are not needed (or desired). Preferably, a homogenous liquid beverage is obtained by hand mixing with a spoon for about 90 seconds or less, and more preferably for about 45 seconds or less. Indeed, one of the major advantages of the present powdered compositions is that only minimal mixing is required.

Of course, optional ingredients can be included in the powdered compositions of this invention so long as they do not adversely affect the ability of the acidified milk beverage to be prepared by addition of the powdered compositions to pasteurized liquid milk or otherwise impair the organoleptic properties. Thus, for example, emulsifiers, flavorings, colorants, calcium fortification agents, vitamins, minerals, probiotics, prebiotics, fiber, and the like can be incorporated into the present powdered compositions. Suitable calcium fortification agents include, but are not limited to, calcium lactate, tricalcium phosphate, and the like.

Although the present invention is mainly directed to powdered compositions which are to be added to a milk product, it can also be used to prepare a similar powdered composition containing milk powders (e.g., agglomerated skim milk powder, full fat or reduced fat milk powder, and the like) which can then be reconstituted in water to form a similar acidified milk beverage. In such a case, the milk powders may be added to the dry homogenous mixture or the milk powder can be added to the water first and then followed by the addition of the dry homogenous mixture.

Although this invention is mainly directed to preparation of instant acidified milk beverages, the technology can be used to prepare other types of instant food products which can be quickly and easily prepared by the consumer at a desired time by either mixing into a milk product or water as appropriate. Such products include, but are not limited to, salad dressings, sauces, soups, and the like. Of course, flavorings can be incorporated into the powdered compositions to achieve the desired product flavor profile.

The Examples that follow are intended to illustrate, and not to limit, the invention. All percentages and ratios used herein are by weight, unless otherwise indicated. All reference cited in the present specification are hereby incorporated by reference.

Example 1

In this example, illustrative of an inventive powdered composition (i.e., no citric acid), a strawberry flavored powdered composition containing the following ingredients was prepared:

| Ingredient | Gr/Serve (240 ml) | Amount (%) |
|---|---|---|
| Sweetener | 0.13 | 0.93 |
| Flavors | 0.28 | 2.00 |
| Guar Gum | 0.8 | 5.71 |
| Tetrasodium Pyrophosphate | 0.2 | 1.43 |
| Maltodextrin | 6.738 | 48.13 |
| Inulin | 2.8 | 20.00 |
| Tripotassium citrate | 0.35 | 2.50 |
| Colorants | 0.302 | 2.16 |
| Monocalcium Phosphate | 1.2 | 8.57 |
| Monopotassium Phosphate | 1.2 | 8.57 |
| | 14.00 | 100 |

First, 1600 grams of the powders were placed in a 5 quart Hobart bowl and mixed using a Hobart mixer for 12 minutes. Next, 14 grams of this mix was weighed out and added to a glass of HTST pasteurized skim milk (240 ml). The product was prepared by gently hand stirring the powder into the milk with a spoon for around 45 seconds.

The resulting homogenous acidified milk beverage had a pH of 5.60 and a viscosity of about 55 centipoise. The acidified milk beverage had an excellent strawberry flavor and a smooth texture; no curds were observed.

Example 2

In this example, illustrative of an inventive powdered composition (i.e., no citric acid), a strawberry flavored powdered composition containing the following ingredients was prepared:

| Ingredient | Gr/Serve (240 ml) | Amount (%) |
| --- | --- | --- |
| Sweetener | 0.13 | 0.39 |
| Flavors | 0.28 | 0.84 |
| Guar Gum | 0.8 | 2.41 |
| Tetrasodium Pyrophosphate | 0.2 | 0.60 |
| Maltodextrin | 6.738 | 20.30 |
| Inulin | 2.8 | 8.43 |
| Tripotassium citrate | 0.35 | 1.05 |
| Colorants | 0.302 | 0.91 |
| Monocalcium Phosphate | 1.2 | 3.61 |
| Monopotassium Phosphate | 1.2 | 3.61 |
| Non Fat Dry Milk | 19.2 | 57.83 |
| | 33.20 | 100 |

First, 1600 grams of the powders were placed in a 5 quart Hobart bowl and mixed using a Hobart mixer for 12 minutes. Then, 33.2 g of this mix was weighed out and added to a glass of water (240 ml). The product was prepared by gently hand stirring the powder into the milk with a spoon for around 45 seconds.

The homogenous acidified milk beverage had a pH of 5.61 and a viscosity of about 50 centipoise. The acidified milk beverage had an excellent strawberry flavor and a smooth texture; no curds were observed.

Example 3

In this example, illustrative of an inventive powdered composition (i.e., no citric acid), a strawberry flavored powdered composition containing the following ingredients was prepared:

| Ingredient | Gr/Serve (240 ml) | Amount (%) |
| --- | --- | --- |
| Sweetener | 0.13 | 0.93 |
| Flavors | 0.28 | 2.00 |
| Guar Gum | 0.8 | 5.71 |
| Tetrasodium Pyrophosphate | 0.2 | 1.43 |
| Maltodextrin | 6.738 | 48.13 |
| Inulin | 2.8 | 20.00 |
| Tripotassium citrate | 0.35 | 2.50 |
| Colorants | 0.302 | 2.16 |
| Monocalcium Phosphate | 1.2 | 8.57 |
| Monopotassium Phosphate | 1.2 | 8.57 |
| | 14.00 | 100 |

First, 1600 grams of the powders were placed in a 5 quart Hobart bowl and mixed using a Hobart mixer for 12 minutes. Then, 14 grams of this mix was weighed out and added to a glass of UHT milk (240 ml). The product was prepared by gently stirring the powder into the milk with a spoon for around 45 seconds.

The homogenous acidified milk beverage had a pH of about 5.72 and a viscosity of about 60 centipoise. The acidified milk beverage had an excellent strawberry flavor and a smooth texture; no curds were observed.

Control Example 4

A strawberry flavored powdered composition, similar to the composition prepared in Example 1 except for the addition of citric acid, with the following ingredients:

| Ingredient | Gr/Serve (240 ml) | Amount (%) |
| --- | --- | --- |
| Sweetener | 0.18 | 1.29 |
| Flavors | 0.28 | 2.00 |
| Guar Gum | 0.8 | 5.71 |
| Tetrasodium Pyrophosphate | 0.2 | 1.43 |
| Maltodextrin | 8.288 | 59.20 |
| Inulin | 2.8 | 20.00 |
| Tripotassium citrate | 0.35 | 2.50 |
| Colorants | 0.002 | 0.01 |
| Citric acid | 1.1 | 7.86 |
| | 14.00 | 100 |

First, 1600 grams of the powders were placed in a 5 quart Hobart bowl and mixed using a Hobart mixer for 12 minutes. Then, 14 grams of this mix was weighed out and added to a glass of HTST pasteurized skim milk (240 ml) and hand stirred with a spoon for about 45 seconds.

The homogenous acidified milk beverage had a pH of about 4.56. The acidified milk beverage had large curds approximately 3 mm to 5 mm in size throughout the beverage.

Control Example 5

A strawberry flavored powdered composition, similar to the composition prepared in Example 2 except for the addition of citric acid, with the following ingredients:

| Ingredient | Gr/Serve (240 ml) | Amount (%) |
| --- | --- | --- |
| Sweetener | 0.13 | 0.85 |
| Flavors | 0.28 | 1.84 |
| Guar Gum | 0.8 | 5.25 |
| Tetrasodium Pyrophosphate | 0.2 | 1.31 |
| Maltodextrin | 6.74 | 44.19 |
| Inulin | 2.8 | 18.36 |
| Colorants | 0.302 | 1.98 |
| Citric acid | 1.1 | 13.11 |
| Trisodium Citrate | 2 | 13.11 |
| | 15.252 | 100 |

First, 1600 grams of the powders were placed in a 5 quart Hobart bowl and mixed using a Hobart mixer for 12 minutes. Then, 15.25 g of this mix was weighed out and added to a glass of HTST pasteurized skim milk (240 ml). The product was prepared by gently stirring the powder into the milk with a spoon for around 45 seconds.

The homogenous acidified milk beverage had a pH of about 5.57. The acidified milk beverage had a lot of curds approximately 2 mm to 3 mm in size on the top and bottom portions of the beverage. Although the final pH of this product was close to example 2, there was still curd formation present in the sample.

The table below summarizes the results of the foregoing examples:

|  | Inventive Samples | | | Control Samples | |
| --- | --- | --- | --- | --- | --- |
| Sample No. | 1 | 2 | 3 | 4 | 5 |
| Milk Type | HTST | Milk Powder Reconstituted | UHT | HTST | HTST |
| Final pH | 5.6 | 5.61 | 5.72 | 4.56 | 5.57 |
| Curd Formation | No | No | No | Yes | Yes |

What is claimed is:

1. A powdered composition for preparing an instant acidified milk beverage with a pH ranging from about 5.0 to about 6.2 using a pasteurized liquid milk product independent of the method of pasteurization, said powdered composition comprising at least one edible monobasic salt of polyprotonic acid with a pKa less than about 4.4, and optional sweetener, thickener, buffering salt, fiber, bulking agent, anti-caking agent, flavorant and colorant with minimal mixing to form an acidified milk beverage and wherein the powdered composition is substantially free of common food grade acids; and the powdered composition including the at least one edible monobasic salt of polyprotonic acid effective to form the acidified milk beverage having a smooth texture from the pasteurized milk product obtained from UHT pasteurized milk and effective to form the acidified milk beverage having a smooth texture from the pasteurized milk product obtained from HTST pasteurized milk; and wherein the at least one edible monobasic salt of polyprotonic acid is phosphate.

2. A powdered composition for preparing an instant acidified milk beverage with a pH ranging from about 5.0 to about 6.2 using a pasteurized powdered milk product independent of the method of pasteurization, said powdered composition comprising at least one edible monobasic salt of polyprotonic acid with a pKa less than about 4.4, and optional sweetener, thickener, buffering salt, fiber, bulking agent, anti-caking agent, flavorant and colorant with minimal mixing to form an acidified milk beverage and wherein the powdered composition is substantially free of common food grade acids; and the powdered composition including the at least one edible monobasic salt of polyprotonic acid effective to form the acidified milk beverage having a smooth texture from the pasteurized milk product obtained from UHT pasteurized milk and effective to form the acidified milk beverage having a smooth texture from the pasteurized milk product obtained from HTST pasteurized milk; and wherein the at least one edible monobasic salt of polyprotonic acid is phosphate.

3. The powdered composition of claim 2, further comprising a buffer salt selected from the group consisting of dibasic mineral salts of citrate, dibasic mineral salts of phosphate, dibasic mineral salts of pyrophosphate, tribasic mineral salts of citrate, tribasic mineral salts of phosphate, tribasic mineral salts of pyrophosphate, dibasic mineral salts of malate, dibasic mineral salts of adipate, dibasic mineral salts of fumarate, and dibasic mineral salts of tartarate.

4. The powdered composition of claim 2, further comprising a buffer salt selected from the group consisting of disodium citrate, trisodium citrate, dicalcium citrate, tricalcium citrate, dimagnesium citrate, trimagnesium citrate, disodium phosphate, trisodium phosphate, dipotassium phosphate, tripotassium phosphate, dicalcium phosphate, tricalcium phosphate, and mixtures thereof.

5. The powdered composition of claim 2, further comprising a thickener.

6. A powdered composition for preparing an instant acidified milk beverage with a pH ranging from about 5.0 to about 6.2 using a pasteurized milk product independent of the method of pasteurization, said powdered composition consisting essentially of:
   at least one edible monobasic salt of polyprotonic acid with a pKa less than about 4.4 in an amount effective to provide a pH of about 5 to about 6.2 when mixed with the pasteurized milk product so that the pH of the pasteurized milk product does not result in the formation of curds;
   one or more optional ingredients selected from the group consisting of sweetener, thickener, buffering salt, fiber, bulking agent, anti-caking agent, fruit juice solids, flavorants and colorants;
   wherein the powdered composition is substantially free of added common food grade acids, effective to form the acidified milk beverage having a smooth texture from the pasteurized milk product obtained from UHT pasteurized milk, and effective to form the acidified milk beverage having a smooth texture from the pasteurized milk product obtained from HTST pasteurized milk; and wherein the at least one edible monobasic salt of polyprotonic acid is phosphate.

7. The powdered composition of claim 6, wherein the powdered composition is effective to provide a viscosity of 50-60 centipoise when mixed with the pasteurized liquid milk product.

8. An instant acidified milk beverage prepared from a method comprising:
   combining a pasteurized milk product and a powdered composition, the powdered composition including at least one edible monobasic salt of polyprotonic acid with a pKa less than about 4.4, one or more optional ingredients selected from the group consisting of sweetener, thickener, buffering salt, fiber, bulking agent, anti-caking agent, fruit juice solids, flavorants and colorants, and substantially free of other added food grade acids, the at least one monobasic salt of polyprotonic acid selected from the group consisting monopotassium phosphate, monosodium phosphate, monocalcium phosphate, monomagnesium phosphate, and mixtures thereof;
   mixing the pasteurized milk product and the powdered composition for about 90 seconds or less using a spoon until substantially smooth to provide the instant acidified milk beverage having a pH of about 5.0 to about 6.2; and
   the powdered composition including the at least one edible monobasic salt of polyprotonic acid effective to form the acidified milk beverage having a smooth texture from the pasteurized milk product obtained from UHT pasteurized milk and effective to form the acidified milk beverage having a smooth texture from the pasteurized milk product obtained from HTST pasteurized milk.

9. The instant acidified milk beverage of claim 8, wherein the instant acidified milk beverage has a viscosity of 50-60 centipoise.

10. The instant acidified milk beverage of claim 8, wherein the pasteurized milk product is a pasteurized powdered milk product, and prior to mixing, the pasteurized powdered milk product and the powdered composition are further combined with water.

11. The instant acidified milk beverage of claim 8 wherein the pasteurized milk product is a pasteurized liquid milk product and selected from the group consisting of UHT pasteurized milk, HTST pasteurized milk, and mixtures thereof.

12. A powdered composition for preparing an instant acidified milk beverage with a pH ranging from about 5.0 to about 6.2 using a pasteurized liquid milk product independent of the method of pasteurization, said powdered composition comprising at least one edible monobasic salt of polyprotonic acid with a pKa less than about 4.4, and optional sweetener, thickener, buffering salt, fiber, bulking agent, anti-caking agent, flavorant and colorant with minimal mixing to form an acidified milk beverage and wherein the powdered composition includes no common food grade acids; and the powdered composition including the at least one edible monobasic salt of polyprotonic acid effective to form the acidified milk beverage having a smooth texture from the pasteurized milk product obtained from UHT pasteurized milk and effective to form the acidified milk beverage having a smooth texture from the pasteurized milk product obtained from HTST pasteurized milk; and wherein the at least one edible monobasic salt of polyprotonic acid is phosphate.

13. A powdered composition for preparing an instant acidified milk beverage with a pH ranging from about 5.0 to about 6.2 using a pasteurized powdered milk product independent of the method of pasteurization, said powdered composition comprising at least one edible monobasic salt of polyprotonic acid with a pKa less than about 4.4, and optional sweetener, thickener, buffering salt, fiber, bulking agent, anti-caking agent, flavorant and colorant with minimal mixing to form an acidified milk beverage and wherein the powdered composition includes no common food grade acids; and the powdered composition including the at least one edible monobasic salt of polyprotonic acid effective to form the acidified milk beverage having a smooth texture from the pasteurized milk product obtained from UHT pasteurized milk and effective to form the acidified milk beverage having a smooth texture from the pasteurized milk product obtained from HTST pasteurized milk; and wherein the at least one edible monobasic salt of polyprotonic acid is phosphate.

14. The powdered composition of claim 13, wherein the at least one edible monobasic salt of polyprotonic acid is selected from the group consisting of citrate, phosphate, malate, adipate, fumarate, tartarate, pyrophosphate, and mixtures thereof.

15. The powdered composition of claim 13, wherein the at least one edible monobasic salt of polyprotonic acid is citrate.

16. The powdered composition of claim 13, further comprising a buffer salt selected from the group consisting of dibasic mineral salts of citrate, dibasic mineral salts of phosphate, dibasic mineral salts of pyrophosphate, tribasic mineral salts of citrate, tribasic mineral salts of phosphate, tribasic mineral salts of pyrophosphate, dibasic mineral salts of malate, dibasic mineral salts of adipate, dibasic mineral salts of fumarate, and dibasic mineral salts of tartarate.

17. The powdered composition of claim 13, further comprising a buffer salt selected from the group consisting of disodium citrate, trisodium citrate, dicalcium citrate, tricalcium citrate, dimagnesium citrate, trimagnesium citrate, disodium phosphate, trisodium phosphate, dipotassium phosphate, tripotassium phosphate, dicalcium phosphate, tricalcium phosphate, and mixtures thereof.

18. The powdered composition of claim 13, further comprising a thickener.

19. A powdered composition for preparing an instant acidified milk beverage with a pH ranging from about 5.0 to about 6.2 using a pasteurized milk product independent of the method of pasteurization, said powdered composition comprising: at least one edible monobasic salt of polyprotonic acid with a pKa less than about 4.4 in an amount effective to provide a pH of about 5 to about 6.2 when mixed with the pasteurized milk product so that the pH of the pasteurized milk product does not result in the formation of curds; one or more optional ingredients selected from the group consisting of sweetener, thickener, buffering salt, fiber, bulking agent, anti-caking agent, fruit juice solids, flavorants and colorants; wherein the powdered composition is free of added common food grade acids, effective to form the acidified milk beverage having a smooth texture from the pasteurized milk product obtained from UHT pasteurized milk, and effective to form the acidified milk beverage having a smooth texture from the pasteurized milk product obtained from HTST pasteurized milk; and wherein the at least one edible monobasic salt of polyprotonic acid is phosphate.

20. The powdered composition of claim 19, wherein the powdered composition is effective to provide a viscosity of 50-60 centipoise when mixed with the pasteurized liquid milk product.

21. An instant acidified milk beverage prepared from a method comprising: combining a pasteurized milk product and a powdered composition, the powdered composition including at least one edible monobasic salt of polyprotonic acid with a pKa less than about 4.4, one or more optional ingredients selected from the group consisting of sweetener, thickener, buffering salt, fiber, bulking agent, anti-caking agent, fruit juice solids, flavorants and colorants, and free of other added food grade acids, the at least one monobasic salt of polyprotonic acid selected from the group consisting of monopotassium phosphate, monosodium phosphate, monocalcium phosphate, monomagnesium phosphate, and mixtures thereof;

mixing the pasteurized milk product and the powdered composition for about 90 seconds or less using a spoon until substantially smooth to provide the instant acidified milk beverage having a pH of about 5.0 to about 6.2; and the powdered composition including the at least one edible monobasic salt of polyprotonic acid effective to form the acidified milk beverage having a smooth texture from the pasteurized milk product obtained from UHT pasteurized milk and effective to form the acidified milk beverage having a smooth texture from the pasteurized milk product obtained from HTST pasteurized milk.

22. The instant acidified milk beverage of claim 21, wherein the instant acidified milk beverage has a viscosity of 50-60 centipoise.

23. The instant acidified milk beverage of claim 21, wherein the pasteurized milk product is a pasteurized powdered milk product, and prior to mixing, the pasteurized powdered milk product and the powdered composition are further combined with water.

24. The instant acidified milk beverage of claim 21 wherein the pasteurized milk product is a pasteurized liquid milk product and selected from the group consisting of UHT pasteurized milk, HTST pasteurized milk, and mixtures thereof.

* * * * *

UNITED STATES PATENT AND TRADEMARK OFFICE
CERTIFICATE OF CORRECTION

PATENT NO. : 9,131,727 B2
APPLICATION NO. : 12/174185
DATED : September 15, 2015
INVENTOR(S) : Kieran Patrick Spelman et al.

It is certified that error appears in the above-identified patent and that said Letters Patent is hereby corrected as shown below:

ON THE TITLE PAGE:

Item (56) column 2 (Other Publications), line 1, delete "Mewthods", insert -- Methods -- therefor.

IN THE CLAIMS:

Column 8, line 47, in claim 8, after "consisting", insert -- of -- therefor.

Signed and Sealed this
Seventeenth Day of May, 2016

Michelle K. Lee
*Director of the United States Patent and Trademark Office*